United States Patent
Noyes et al.

(10) Patent No.: US 7,917,684 B2
(45) Date of Patent: Mar. 29, 2011

(54) BUS TRANSLATOR

(75) Inventors: Harold B Noyes, Boise, ID (US); Steven P. King, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 22 days.

(21) Appl. No.: 12/265,436

(22) Filed: Nov. 5, 2008

(65) Prior Publication Data

US 2010/0115173 A1 May 6, 2010

(51) Int. Cl.
*G06F 13/36* (2006.01)
*G06K 9/00* (2006.01)

(52) U.S. Cl. .................................. 710/315; 382/181

(58) Field of Classification Search .................. 710/104, 710/105, 110, 305, 306, 307, 315; 382/181, 382/209, 229
See application file for complete search history.

(56) References Cited

U.S. PATENT DOCUMENTS

| | | | | |
|---|---|---|---|---|
| 5,014,327 A * | 5/1991 | Potter et al. | ................... | 382/220 |
| 5,300,830 A | 4/1994 | Hawes | | |
| 5,331,227 A | 7/1994 | Hawes | | |
| 5,581,708 A * | 12/1996 | Iijima | ............................. | 710/11 |
| 6,240,003 B1 | 5/2001 | McElroy | | |
| 6,851,014 B2 * | 2/2005 | Chang et al. | ................... | 711/103 |
| 6,880,087 B1 | 4/2005 | Carter | | |
| 6,906,938 B2 | 6/2005 | Kaginele | | |
| 6,944,710 B2 | 9/2005 | Regev et al. | | |
| 7,032,045 B2 * | 4/2006 | Kostadinov | ................... | 710/105 |
| 7,089,352 B2 | 8/2006 | Regev et al. | | |
| 7,146,643 B2 | 12/2006 | Dapp et al. | | |
| 7,249,213 B2 * | 7/2007 | Feng et al. | ..................... | 710/305 |
| 7,260,558 B1 * | 8/2007 | Cheng et al. | ................... | 706/12 |
| 7,392,229 B2 | 6/2008 | Harris et al. | | |
| 7,444,434 B2 * | 10/2008 | Kravec et al. | ..................... | 710/1 |
| 2003/0014579 A1 * | 1/2003 | Heigl et al. | ................... | 710/105 |
| 2006/0095607 A1 * | 5/2006 | Lim et al. | ........................ | 710/52 |
| 2007/0075878 A1 | 4/2007 | Furodet et al. | | |
| 2007/0127482 A1 | 6/2007 | Harris et al. | | |
| 2007/0282833 A1 | 12/2007 | McMillen et al. | | |

OTHER PUBLICATIONS

Definition of Multiplexer, <http://en.wikipedia.org/wiki/Multiplexer>, accessed on Apr. 13, 2010.*
U.S. Appl. No. 60/652,738, filed Feb. 12, 2005, Harris et al.
U.S. Appl. No. 12/253,966, filed Oct. 18, 2008, Noyes et al.
U.S. Appl. No. 12/253,967, filed Oct. 18, 2008, Noyes et al.
U.S. Appl. No. 12/265,421, filed Nov. 5, 2008, Noyes.
U.S. Appl. No. 12/265,465, filed Nov. 5, 2008, Noyes.
U.S. Appl. No. 12/268,270, filed Nov. 10, 2008, Noyes et al.
U.S. Appl. No. 12/325,875, filed Dec. 1, 2008, Noyes.
U.S. Appl. No. 12/325,982, filed Dec. 1, 2008, Noyes.
U.S. Appl. No. 12/325,986, filed Dec. 1, 2008, Noyes.
U.S. Appl. No. 12/325,990, filed Dec. 1, 2008, Noyes.
U.S. Appl. No. 12/347,403, filed Dec. 31, 2008, Noyes.
U.S. Appl. No. 12/350,132, filed Jan. 7, 2009, Pawlowski.
U.S. Appl. No. 12/350,136, filed Jan. 7, 2009, Pawlowski.

(Continued)

*Primary Examiner* — Khanh Dang
(74) *Attorney, Agent, or Firm* — Fletcher Yoder

(57) ABSTRACT

Disclosed are methods and devices, among which is a device including a bus translator. In some embodiments, the device also includes a core module and a core bus coupled to the core module. The bus translator may be coupled to the core module via the core bus, and the bus translator may be configured to translate between signals from a selected one of a plurality of different types of buses and signals on the core bus.

21 Claims, 13 Drawing Sheets

OTHER PUBLICATIONS

U.S. Appl. No. 12/350,142, filed Jan. 7, 2009, Pawlowski.
U.S. Appl. No. 12/352,311, filed Jan. 12, 2009, Noyes.
Beesley, K. R.; Arabic Morphology Using Only Finite-State Operations; Xerox Research Centre Europe; pp. 50-57.
Bird, S. et al.; One-Level Phonology: Autosegmental Representations and Rules as Finite Automata; Association for Computational Linguistics; University of Edinburgh; vol. 20; No. 1; pp. 55-90; 1994.
Bispo, J. et al.; Regular Expression Matching for Reconfigurable Packet Inspection; IEEE.
Bispo, J. et al.; Synthesis of Regular Expressions Targeting FPGAs: Current Status and Open Issues; IST/INESC-ID, Libson, Portugal; pp. 1-12.
Brodie, B. et al.; A scalable Architecture for High-Throughput Regular-Expression Pattern Matching; Exegy Inc.; pp. 1-12.
Clark, C.; Design of Efficient FPGA Circuits for Matching Complex Patterns in Network Intrusion Detection Systems (Master of Science Thesis); Georgia Institute of Technology; pp. 1-56; Dec. 2003.
Clark, C.; A Unified Model of Pattern-Matching Circuits for Field-Programmable Gate Arrays [Doctoral Dissertation]; Georgia Institute of Technology; pp. 1-177; 2006.
Clark, C. et al.; Scalable Pattern Matching for High Speed Networks; Proceedings of the $12^{th}$ Annual IEEE symposium on Field-Programmable Custom Computing Machines (FCCM'04);Georgia Institute of Technology; pp. 1-9; 2004.
Clark, C. et al.; A Unified Model of Pattern-Matching Circuit Architectures; Tech Report GIT-CERCS-05-20;Georgia Institute of Technology; pp. 1-17.
Fide, S.; String Processing in Hardware; Scalable Parallel and Distributed Systems Lab; Proceedings of the $12^{th}$ Annual IEEE symposium on Field-Programmable Custom Computing Machines (FCCM'04);School of Electrical and Computer Engineering; Georgia Institute of Technology; pp. 1-9; 2004.
Fisk, M. et al.; Applying Fast String Matching to Intrusion Detection; Los Alamos National Laboratory; University of California San Diego; pp. 1-21.
Korenek, J.; Traffic Scanner-Hardware Accelerated Intrusion Detection System; http://www.liberouter.org/ ;2006.
Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.
Lipovski, G.; Dynamic Systolic Associative Memory Chip; IEEE; Department of Electrical and Computer Engineering; University of Texas at Austin; pp. 481-492; 1990.
Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.
Schultz, K. et al.; Fully Parallel Integrated CAM/RAM Using Preclassification to Enable Large Capacities; IEEE Journal on Solid-State Circuits; vol. 31; No. 5; pp. 689-699; May 1996.
Shafai, F. et al.; Fully Parallel 30-MHz, 2.5-Mb CAM; IEEE Journal of Solid-State Circuits, vol. 33; No. 11; pp. 1690-1696; Nov. 1998.
Sidhu, R. et al.; Fast Regular Expression Pattern Matching using FPGAs; Department of EE-Systems; University of Southern California; pp. 1-12.
Wada, T.; Multiobject Behavior Recognition Event Driven Selective Attention Method; IEEE; pp. 1-16; 2000.
Yu, F.; High Speed Deep Packet Inspection with Hardware Support; Electrical Engineering and Computer Sciences; University of California at Berkeley; pp. 1-217; Nov. 22, 2006.
Freescale and Kaspersky® Accelerated Antivirus Solution Platform for OEM Vendors; Freescale Semiconductors Document; pp. 1-16; 2007.
Hurson A. R.; A VLSI Design for the Parallel Finite State Automaton and Its Performance Evaluation as a Hardware Scanner; International Journal of Computer and Information Sciences, vol. 13, No. 6. 1984.

* cited by examiner

US 7,917,684 B2

BUS TRANSLATOR

BACKGROUND

1. Field of Invention

Embodiments of the invention relate generally to electronic devices and, more specifically, in certain embodiments, to electronic devices having a bus translator.

2. Description of Related Art

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware that performs pattern recognition has been designed, and this hardware is believed to be capable of searching a data stream for a relatively large number of patterns relatively quickly. However, implementing this hardware is complicated by the variety of devices with which the hardware might interface. Pattern-recognition devices may be coupled to a variety of different types of processors, e.g., different types of microprocessors, and each of these different types of processors may be configured to communicate with other devices through different types of buses. Manufacturing pattern-recognition devices for each of the different types of buses is more expensive than designing and manufacturing a single version of the device.

This issue is not limited to pattern-recognition devices. Other peripheral devices that are designed to attach to and communicate with processors through processor buses face similar issues. For example, different memory devices are often designed for each of the different buses, and different hard-disk controllers are often manufactured for each of the different buses. For example, a Windows compatible personal computer has specific requirements for large amounts of 32-bit wide DRAM, while a high speed video card requires high-speed SRAM. Designing and manufacturing bus-specific devices is believed to reduce the flexibility of these devices and add to their design costs.

DETAILED DESCRIPTION

Figure 1:
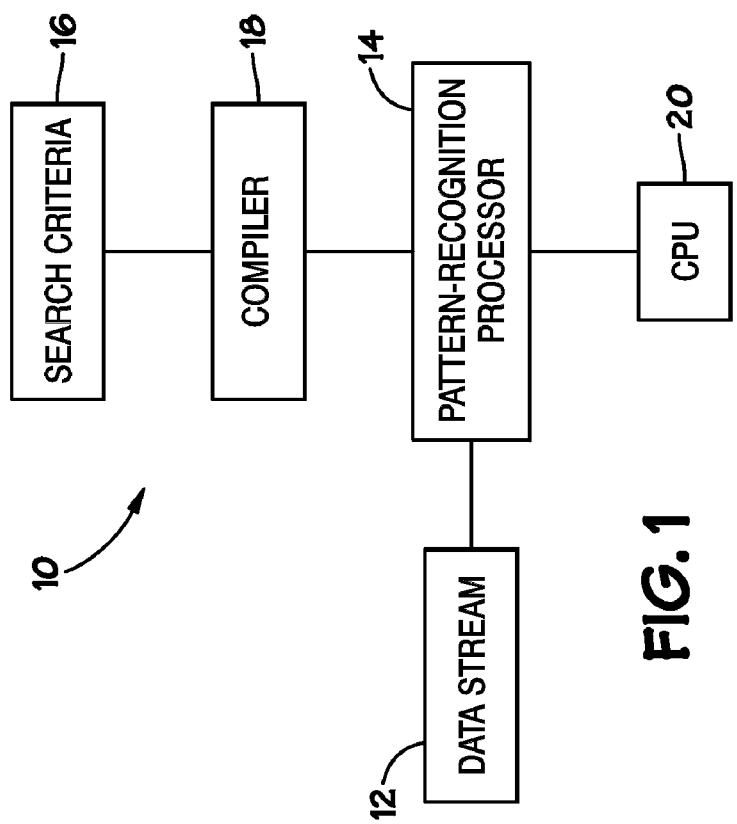
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Or the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern recognition processor 14 may be hardware that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
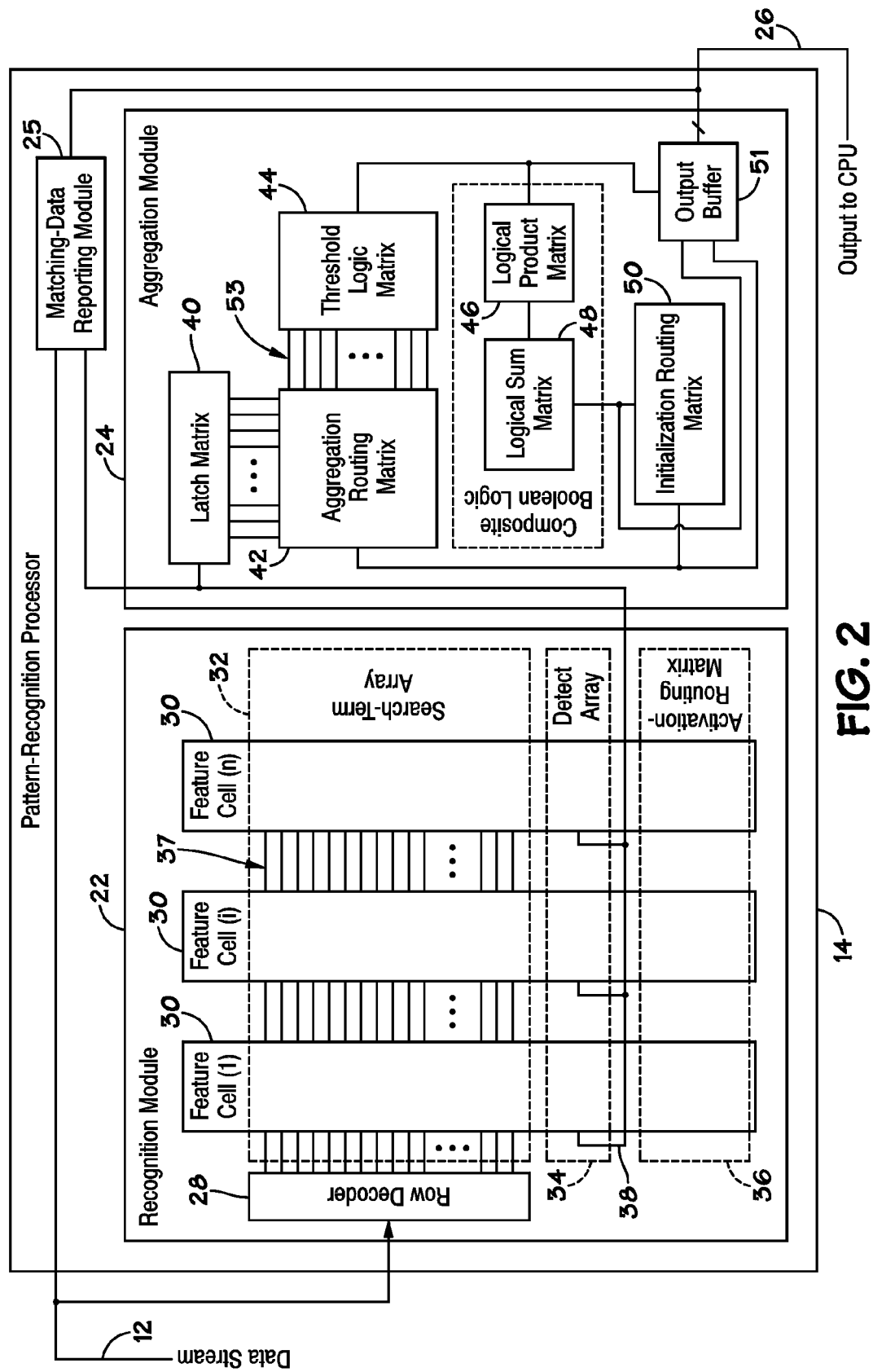
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
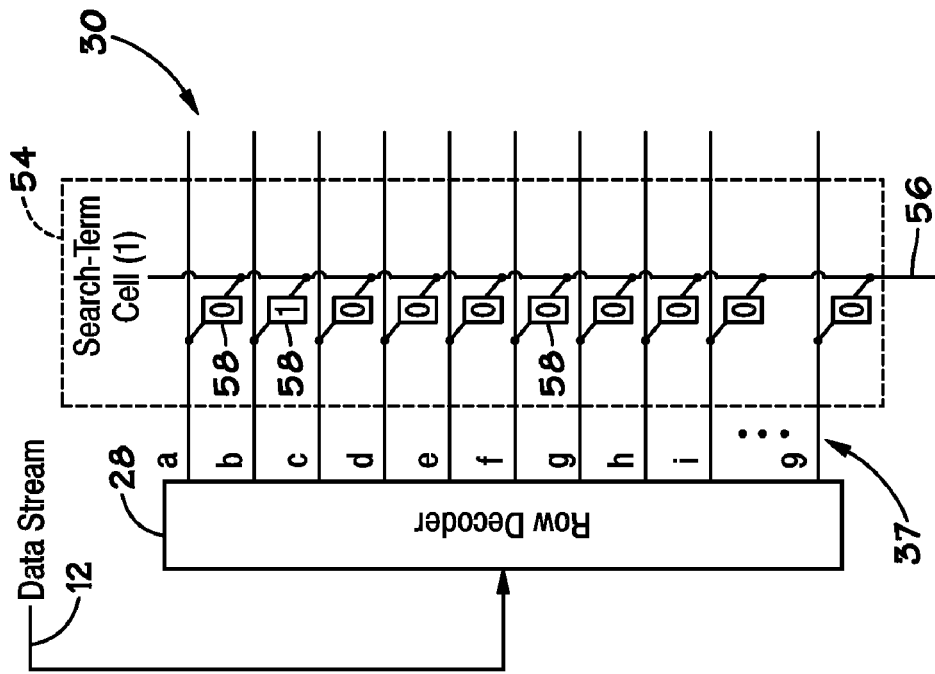
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of non-volatile memory. The memory cells 58 may also include flip-flops, e.g., memory cells made out of logic gates.

Figure 5:
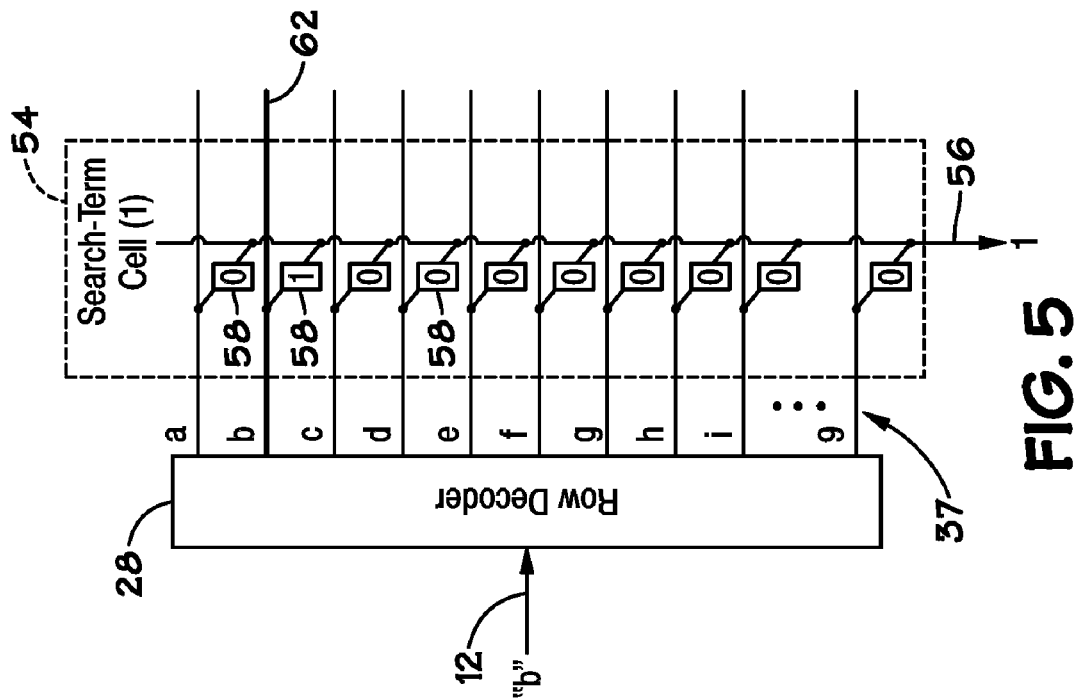
FIGS. 4 and 5 depict the search-term cell of FIG. 3 searching the data stream for a single character.
Figure 4:
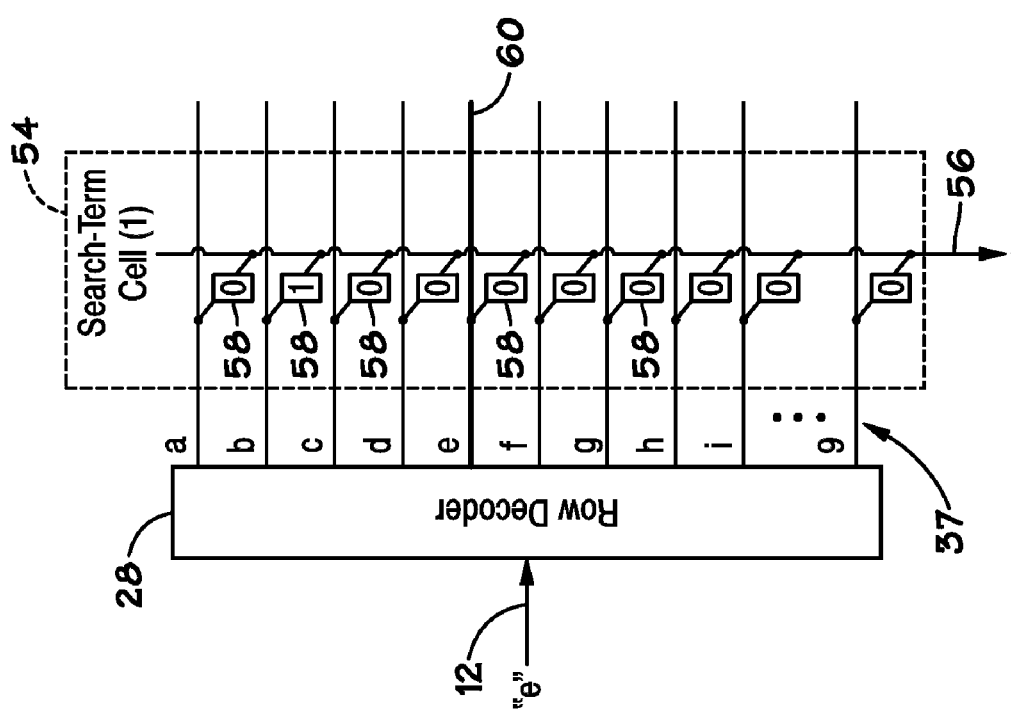

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
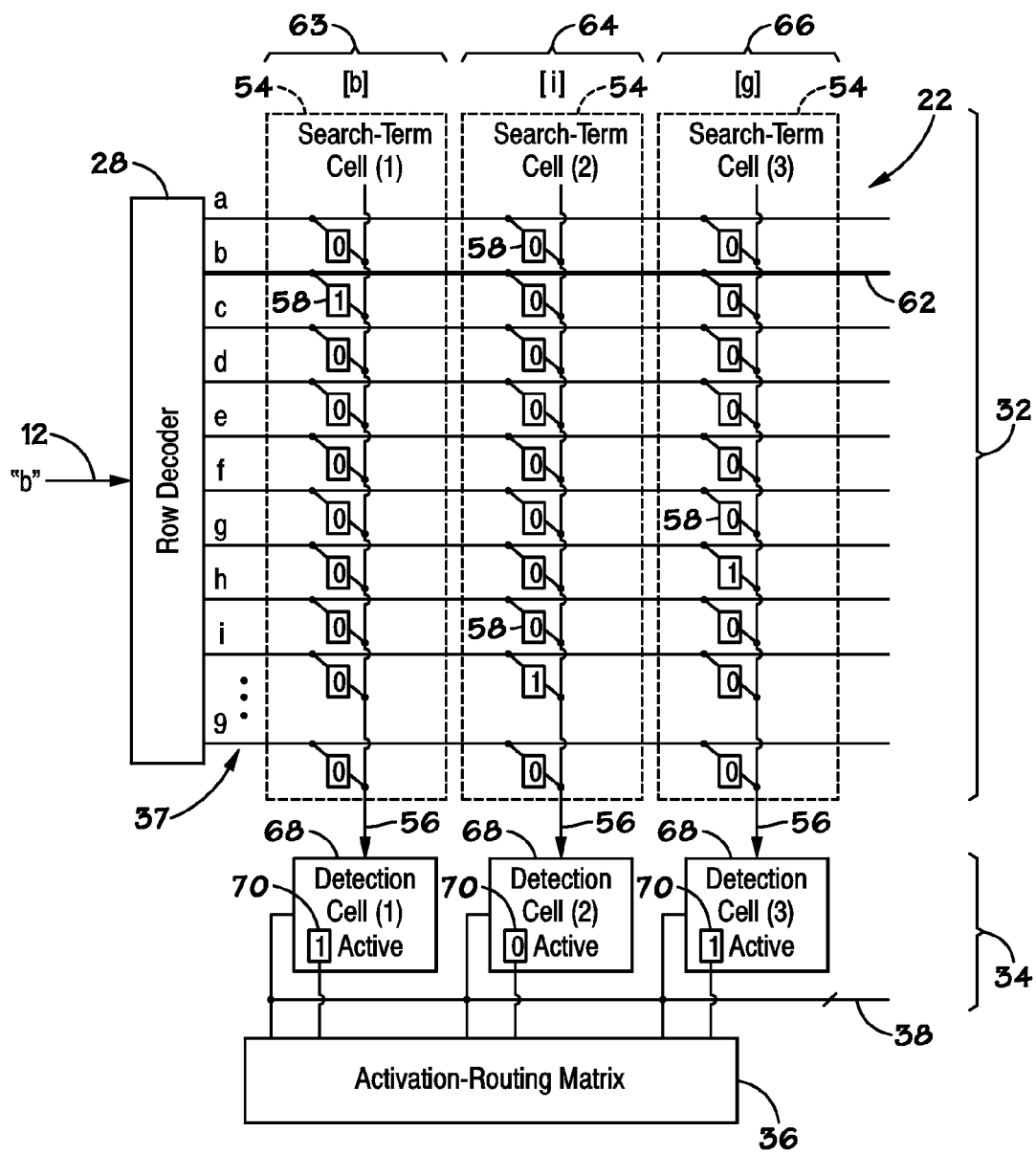
FIGS. 6-8 depict a recognition module including several search-term cells searching the data stream for a word.
Figure 7:
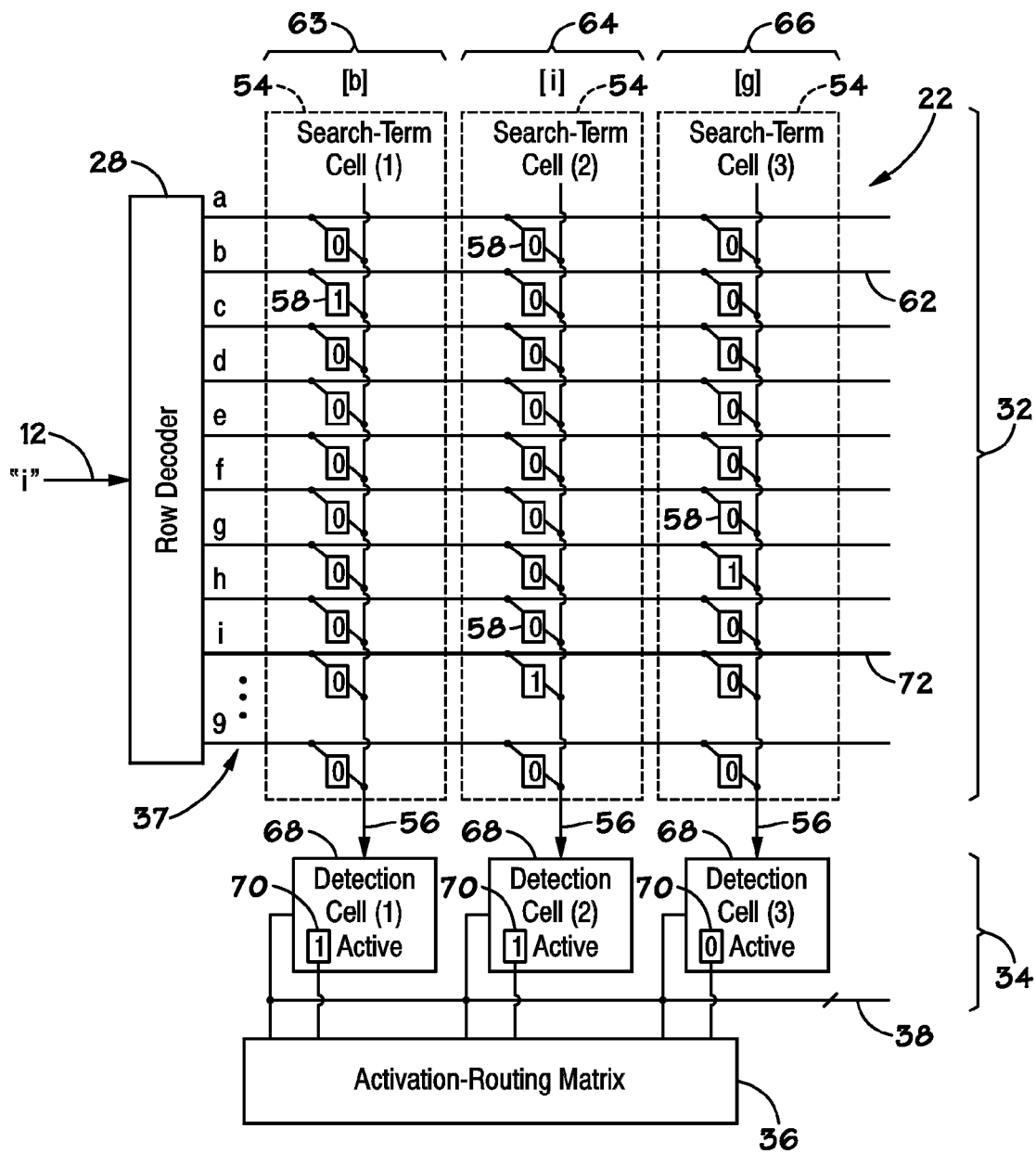
Figure 8:
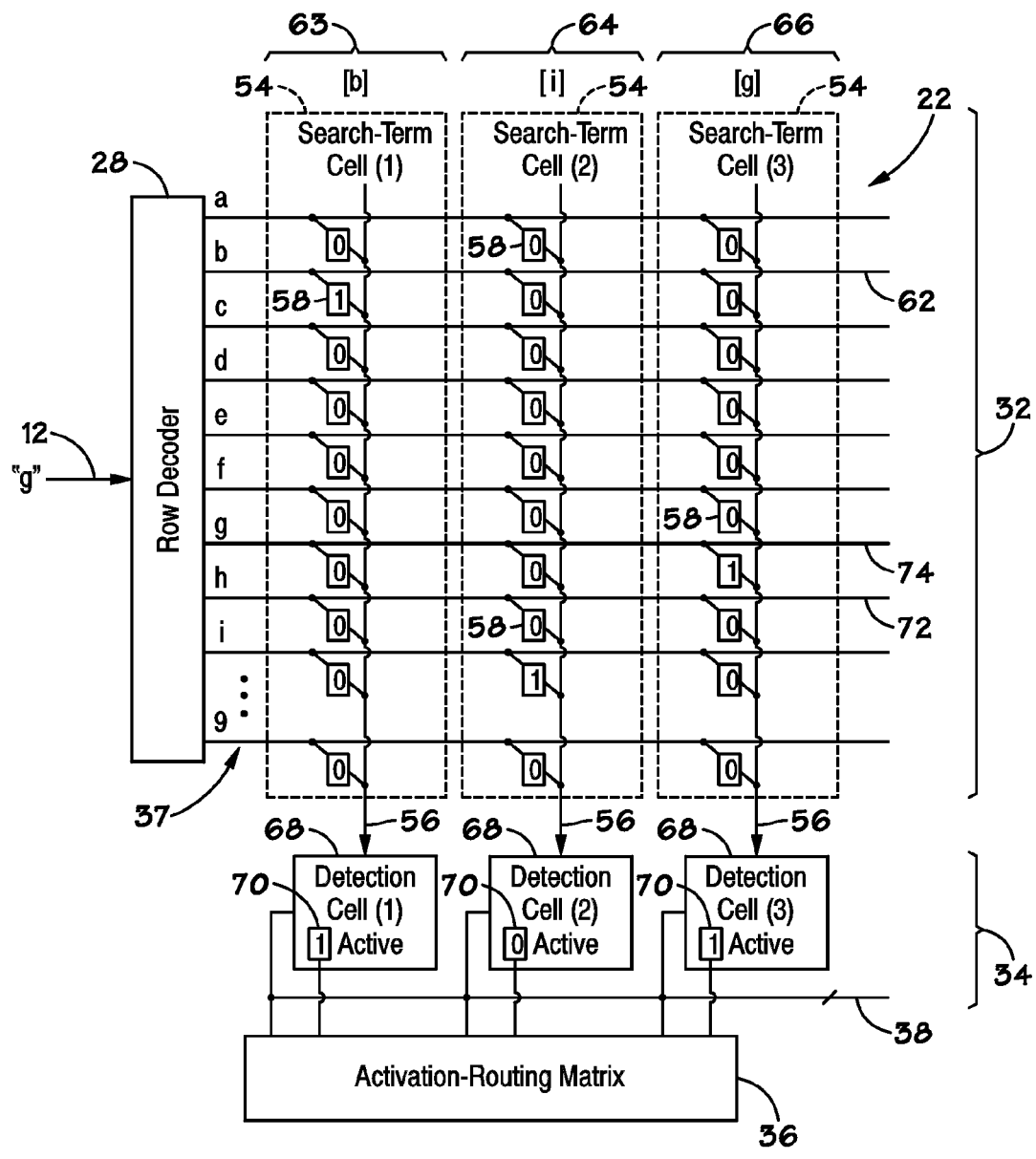

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 56 may then each determine whether they have received a signal indicating a match and whether they are active.

Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
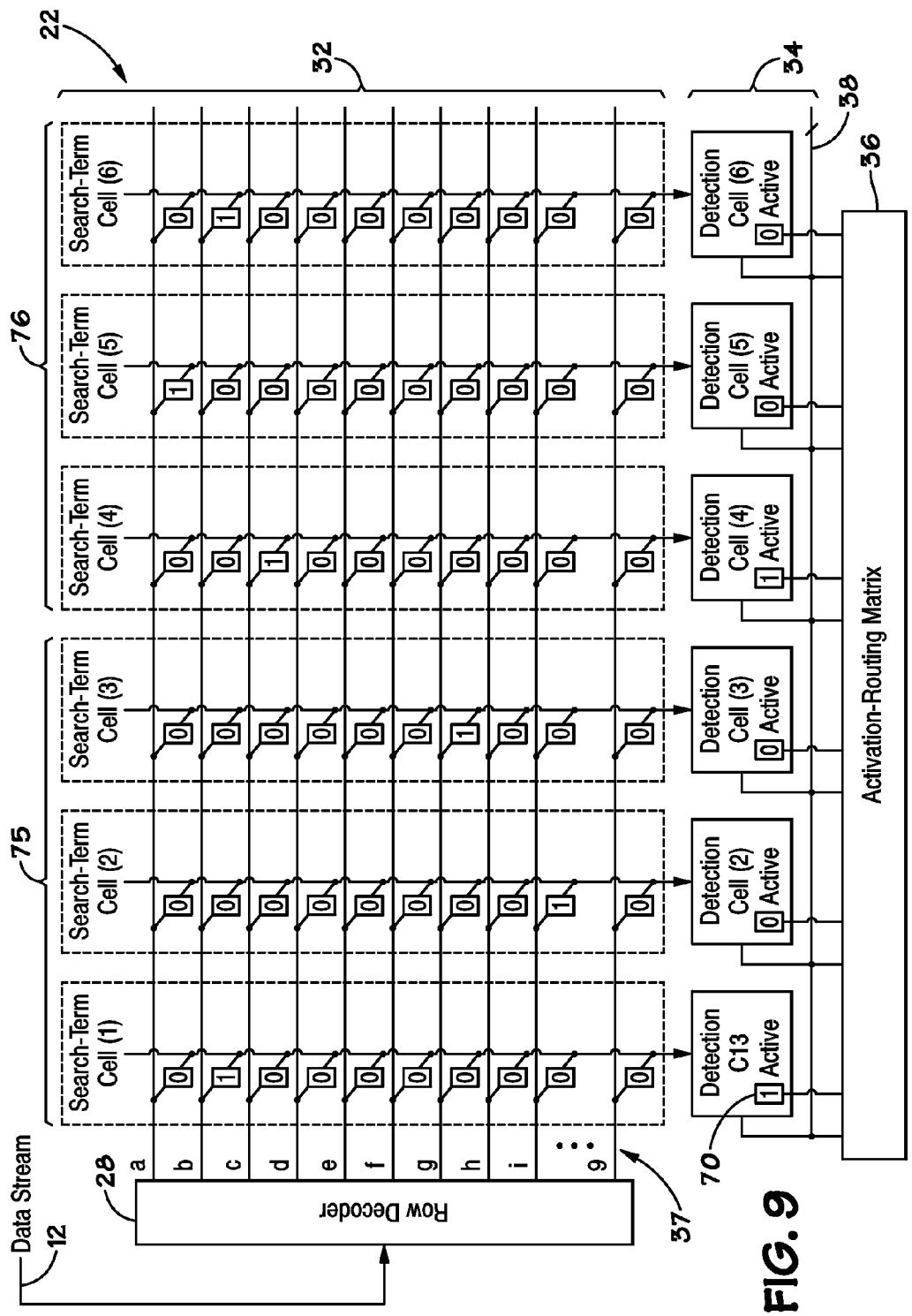
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
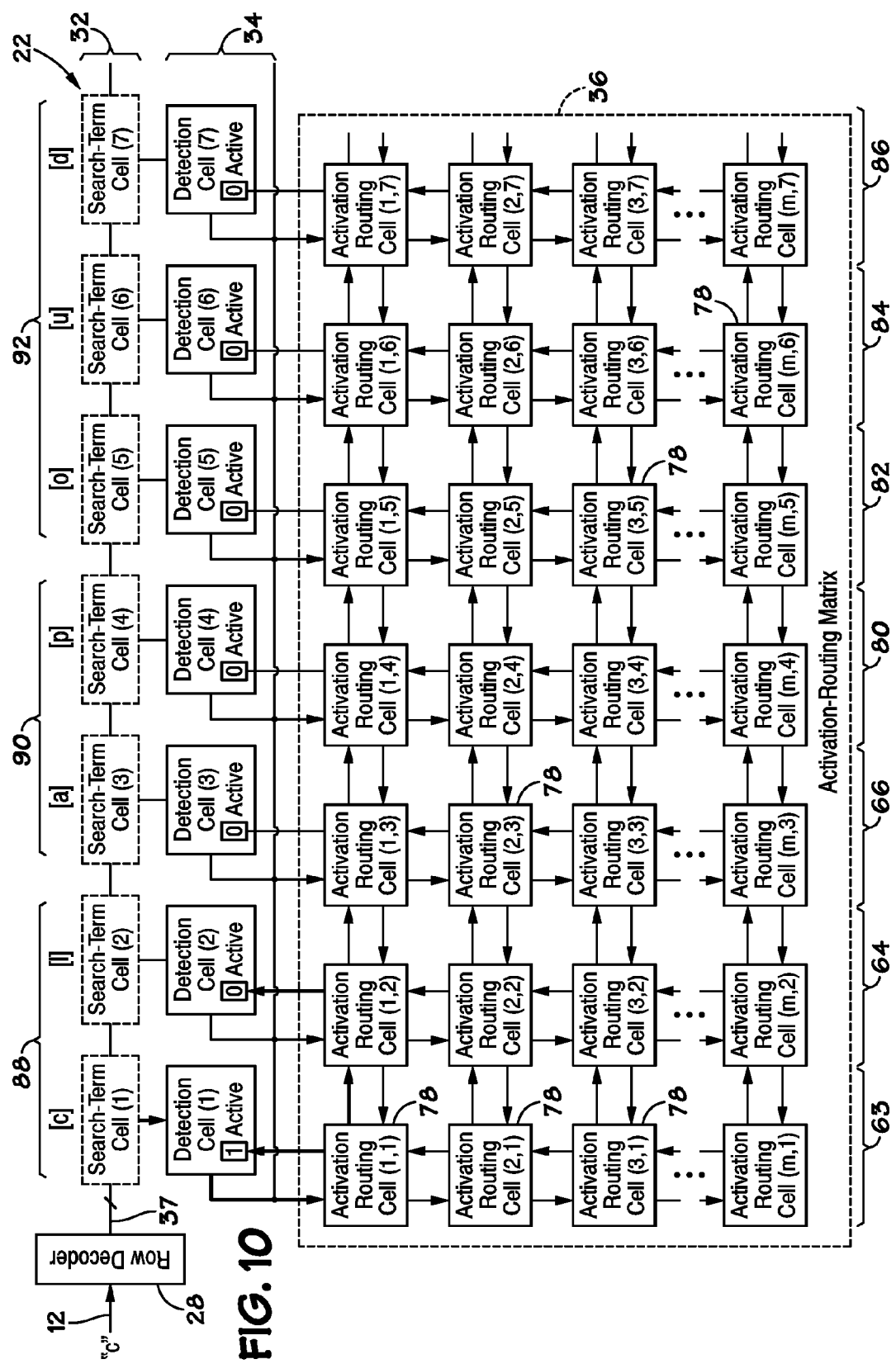
FIGS. 10-12 depict the recognition module searching according to a search criterion that specifies multiple words with the same prefix.
Figure 11:
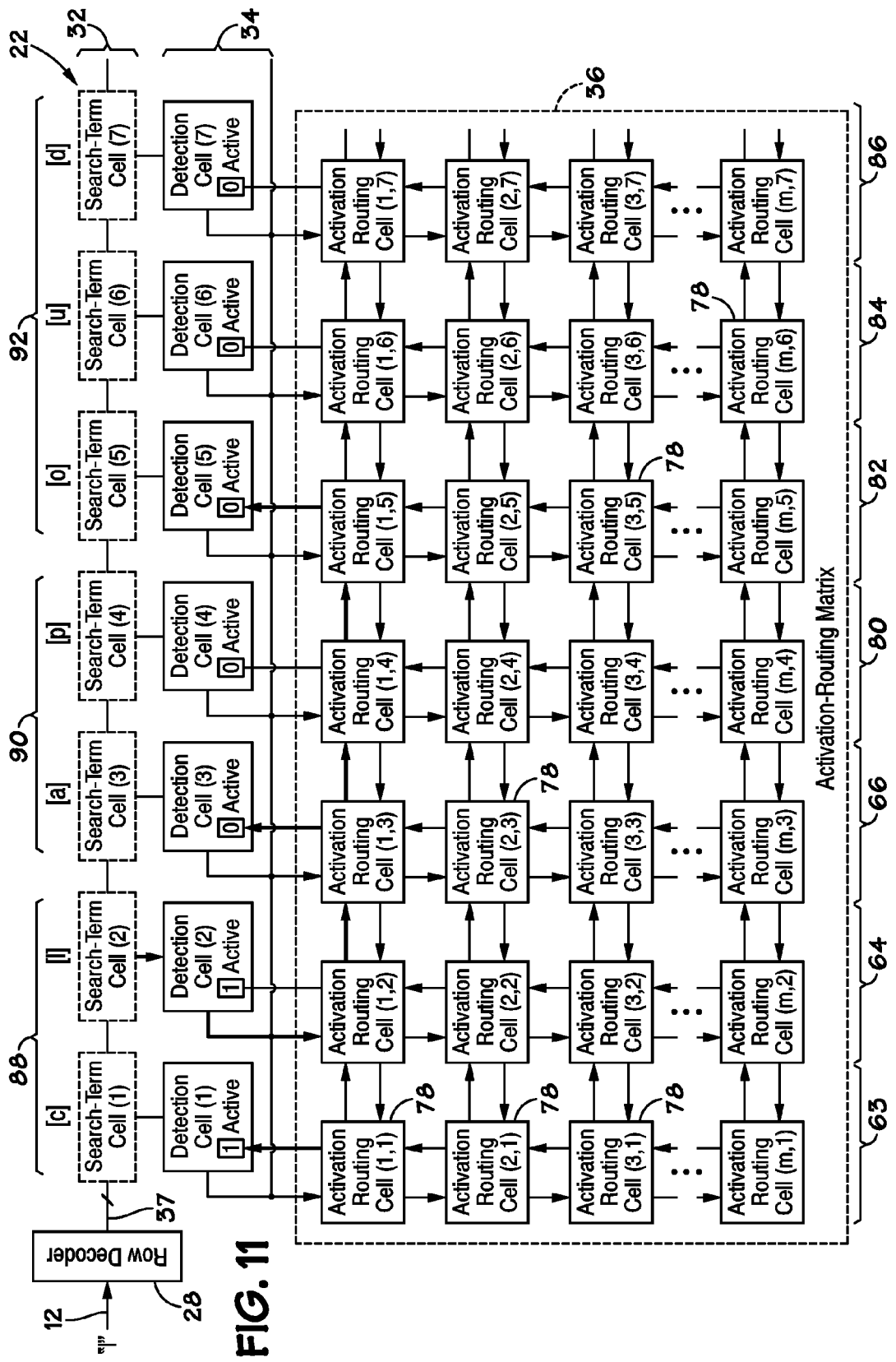
Figure 12:
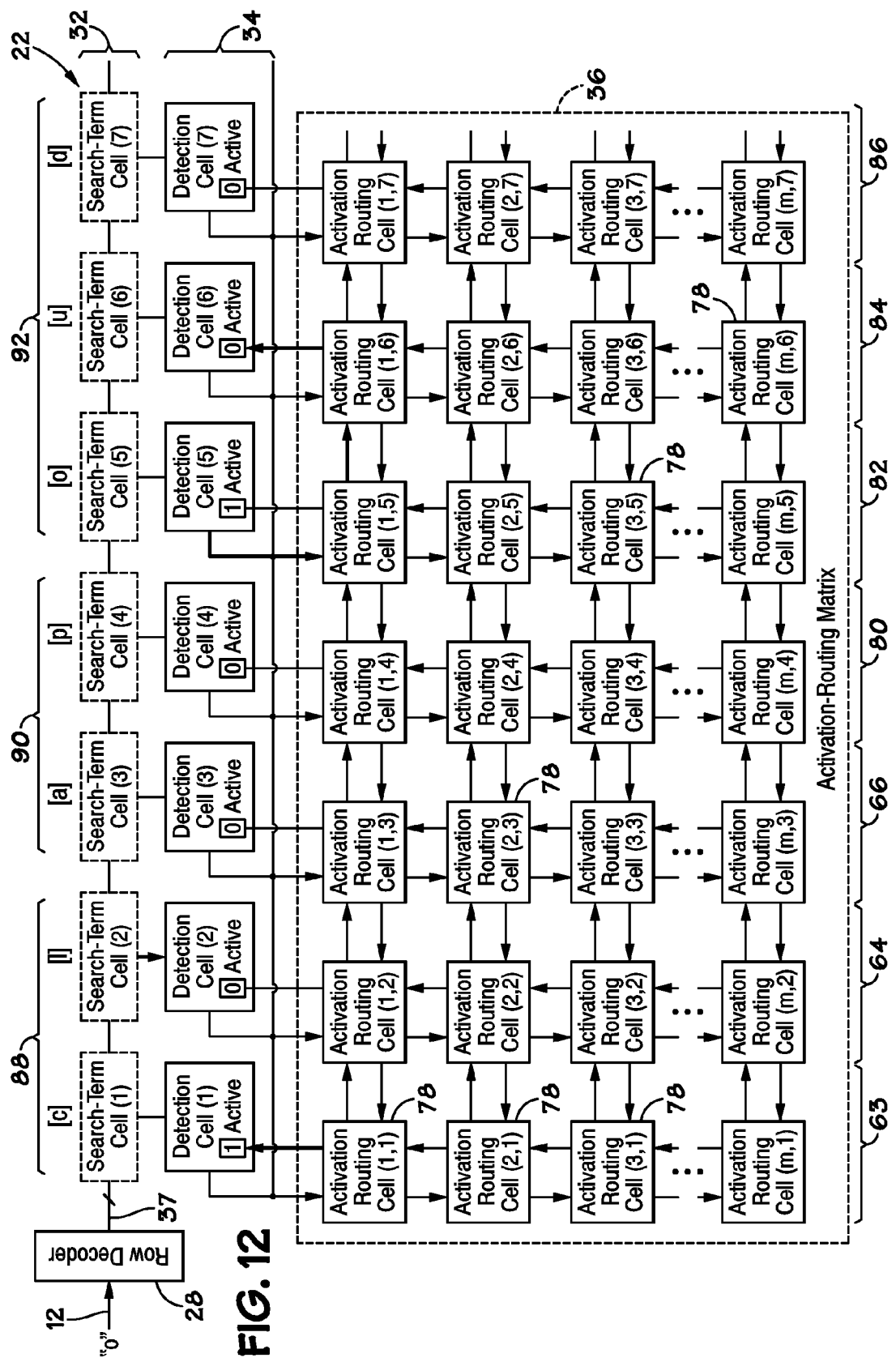

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

Figure 13:
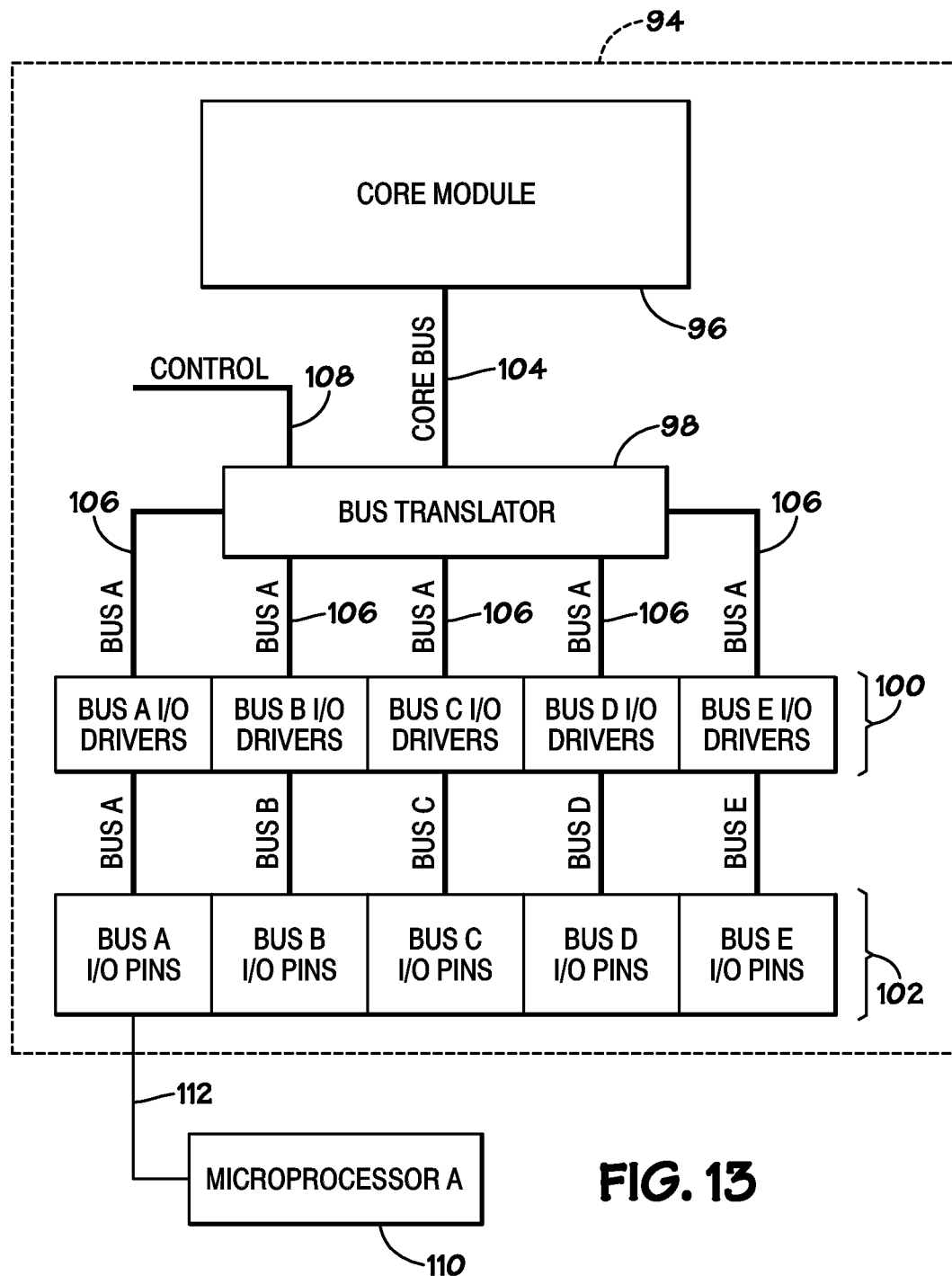
FIG. 13 depicts an embodiment of a bus translator that may be coupled to the pattern-recognition processor of FIG. 2.

FIG. 13 illustrates an example of a device 94 that may include the previously-described pattern-recognition processor 12. The device 94 may include a core module 96, a bus translator 98, a plurality of bus drivers 100 (e.g., drivers A-E), and a plurality of bus physical interfaces 102 (e.g., bus A-E I/O pins). The core module 96 may include the pattern-recognition processor 14, described above with reference to FIGS. 2-12, or a variety of other types of modules. Examples of other types of core modules 96 include memory, e.g. volatile memory, such as dynamic random access memory (DRAM), or nonvolatile memory, such as phase-change memory or flash memory. Other examples of core modules 96 include memory controllers, such as a hard-disk controller or a solid-state-drive (SSD) controller, or data acquisition devices, such as an image capture board or a soundcard.

The core module 96 may be in communication with the bus translator 98 through a core bus 104, and the bus translator 98 may be in communication with each of the plurality of bus drivers 100 through a plurality of different types of buses 106 (e.g., buses A-E). Each of the plurality of different types of buses 106 may connect each of the bus drivers 100 to one of the bus physical interfaces 102.

The bus translator 98 may be configured to translate signals on each of the plurality of different types of buses 106 into signals that are appropriate for the core module 96 to receive through the core bus 104 and vice versa. The bus translator 98 may include a multiplexer or a demultiplexer to select one or more of the plurality of different buses 106 to convey data to/from the core bus 104. The bus translator 98 may also be configured to adjust the timing of signals that convey data between the core bus 104 and the selected one of the plurality of different buses 106 to be appropriate for each of the buses 104 and 106. The bus translator 98 may also be configured to adjust the voltage of signals conveying data between the core bus 104 and the selected one of the plurality of different buses 106.

A control signal 108 may convey signals that configure the bus translator 98. For example, the control signal 108 may convey a signal that configures the bus translator 98 to select one of the different types of buses 106. In some embodiments, the control signal 108 may convey data that is stored in registers in the bus translator 98. In other embodiments, the control signal 108 may be omitted (which is not to suggest that any other feature described herein may not also be omitted), and the bus translator 98 may be configured by blowing fuses within the bus translator 98 during manufacturing or by electrically connecting pins or other electrical connections on the device 94, e.g., with a jumper, after the device 94 is manufactured. The device 94 may be configured to automatically detect which of the different types of buses 106 is being used, e.g., by selecting a bus based on which of the physical bus interfaces 102 is connected to a bus.

The plurality of different buses 106 may include several different types of buses. For example, the plurality of different buses 106 may include an asynchronous bus with non-multiplexed address and data, an asynchronous bus with multiplexed address and data, a synchronous bus with non-multiplexed address and data, a synchronous bus with multiplexed address and data, a synchronous dynamic random access memory (SDRAM) bus, a double data rate (DDR) bus, a DDR2 bus, a DDR3 bus, a DDR4 bus, a PCI bus, a PCI express bus, a PCIx bus, a Serial Gigabit Media Independent Interface (SGMI) bus, or other types of buses, depending on the particular application.

The bus physical interface 102 may include an appropriate number of electrically-conductive contacts, such as pins or contacts of a ball grid array, suitable for each of the different types of buses 106. The bus physical interface 102 may be configured to convey data between the device 94, which may be formed within a packaged semiconductor device, and a printed circuit board (PCB).

In operation, the device 94 may add functionality to a microprocessor 110 (e.g., microprocessor A). A variety of different functions may be added to the microprocessor 110 though the core module 96, such as pattern recognition, additional memory, or data acquisition, for example, as discussed above. The device 94 may communicate with the microprocessor 110 through an external bus 112. The external bus 112 may be one of the types of buses that are compliant with the plurality of different buses 106 coupled to the bus translator 98 within the device 94. The external bus 112 may couple to the physical bus interface 102 that is appropriate for the external bus 112. For example, if the external bus 112 is a DDR3 bus, it may couple to a physical bus interface 102 that is compliant with the DDR3 bus specification. The other physical bus interfaces 102 may remain unused.

As data is conveyed between the microprocessor 110 and the core module 96, the bus translator 98 may translate the signals. Translating the signals may include multiplexing or demultiplexing the signals, increasing or decreasing the timing of the signals, or changing the voltage of the signals. Regardless of which of the plurality of different buses 106 is selected, the translated signals on the core bus 104 may be similar or the same, and the core module 96 may be configured to receive the signals and transmit the signals through the core bus 104.

Figure 14:
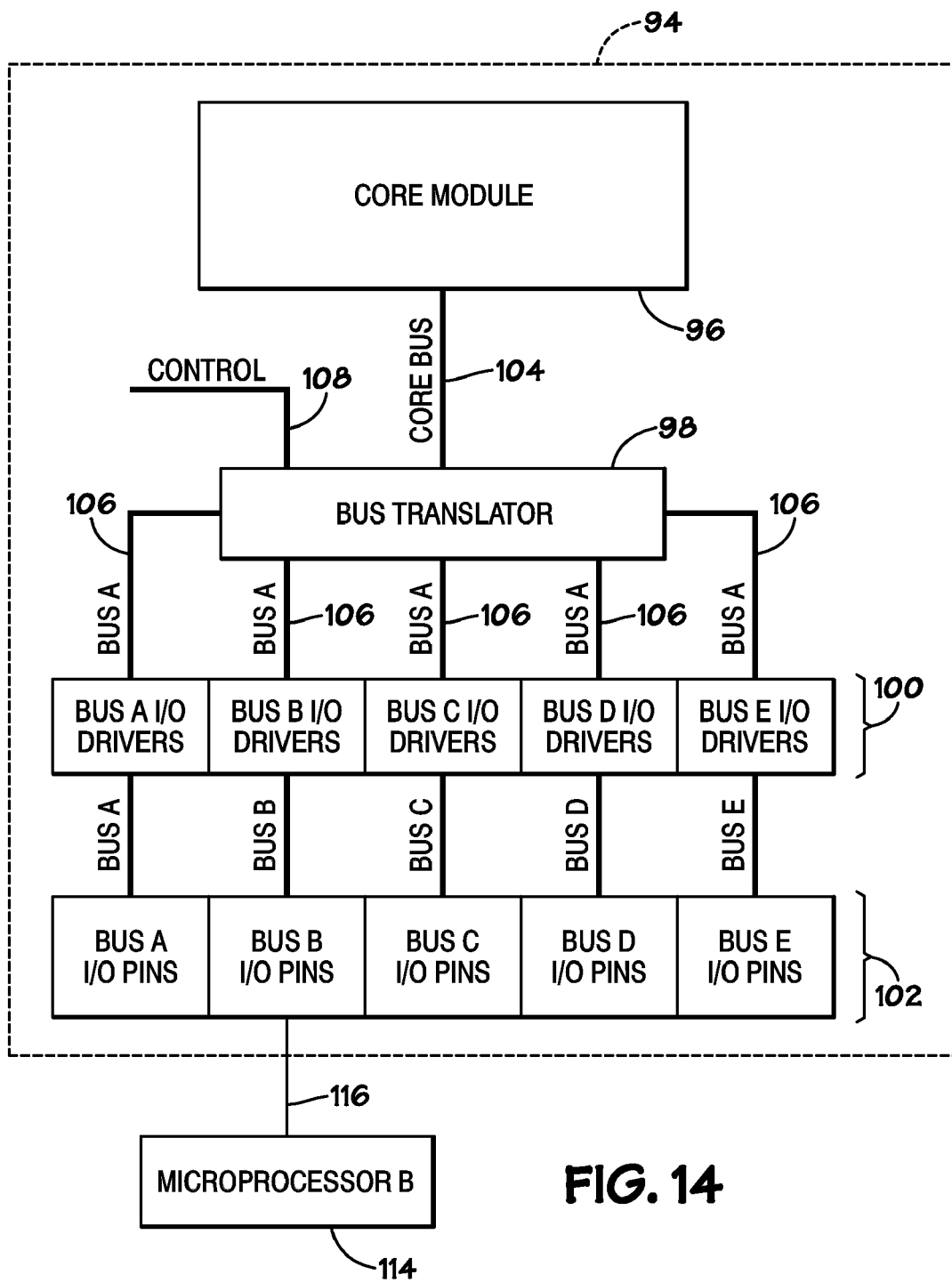
FIG. 14 depicts the bus translator of FIG. 13 coupled to a different bus.

FIG. 14 illustrates another example of the operation of the device 94. In this example, the device 94 is configured to use a different bus among the plurality of different buses 106. A different type of microprocessor 114 (e.g., microprocessor B) may be coupled to the device 94 through a different type of external bus 116 from those that were used in the previous figure. The bus translator 98 may again translate signals from the external bus 116, even though those signals may be different in timing, voltage, and number from those on the previously discussed external bus 112. The translated signals may be conveyed through the core bus 104 to the core module 96.

The bus translator 98 is believed to reduce the cost of providing the functionality in the core module 96. A single device 94 may be manufactured for a plurality of different types of applications using a plurality of different types of external buses. Moreover, because the core bus 104 remains the same or is similar regardless of which of the different types of buses 106 is selected, designers of the core module 96 do not necessarily need to become familiar with each type of bus the core module 96 might communicate through. This is believed to expedite the design of the core module 96 and the addition of functionality to microprocessors.

Figure 15:
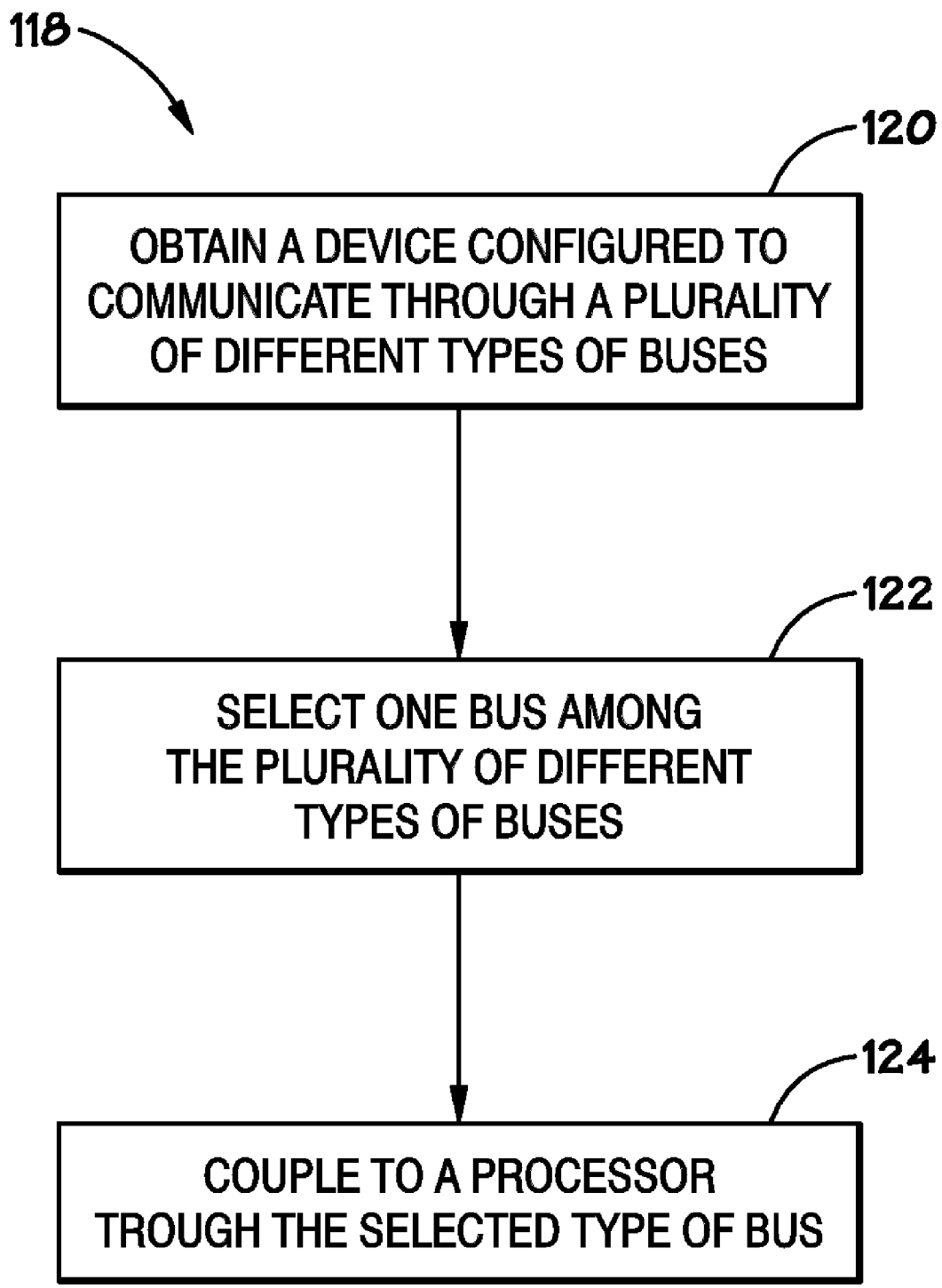
FIG. 15 depicts an example of a process for configuring a device with a bus translator.

FIG. 15 illustrates an example of a process 118 for configuring a device with a bus translator. The process 118 may begin with obtaining a device configured to communicate through a plurality of different types of buses, as illustrated by block 120. Obtaining the device may include manufacturing the device, purchasing the device, or otherwise specifying the device, e.g., contracting for its manufacture or obtaining a system including the device. The plurality of different types of buses may include any of those described above. The device may be configured to communicate through two or more buses, three or more buses, four or more buses, five or more buses, or six or more buses.

Next, one bus among the plurality of different buses may be selected, as illustrated by block 122. Selecting one bus among the plurality of different buses may be performed after or during the manufacture of the device. For example, one of the buses may be selected by blowing fuses in the device, or one of the buses may be selected by choosing one photomask out of a plurality of different photomasks each configured for one of the different types of buses. In embodiments in which the bus is selected with a photomask, the selecting photomask may be used relatively late in the manufacture of the device, e.g., after one metal layer, for the last metal layer, or after the last metal layer in the device. Selecting the bus with a later mask layer maintains flexibility in the type of bus selected. The bus may also be selected with the type of packaging chosen for the device. For instance, the packaging may include electrical contacts, e.g. pins or balls in a ball grid array, appropriate for only the selected type of bus, and these electrical contacts may be wired to an appropriate subset of contacts on a semiconductor chip while other electrical contacts for other types of buses may remain unused. In another example, the bus may be selected after the device is packaged. For instance, the bus may be selected by connecting two or more electrical contacts on the device with a jumper. The bus may also be selected by storing data in memory in the device. For example, registers in the device may store data that indicates which bus is selected. These registers may be written to when the device is manufactured, packaged, installed, initially turned on, or each time the device is turned on, e.g., during a boot sequence.

The device may be coupled to a processor through the selected bus. Coupling the device to the processor through the selected bus may include installing the device on a PCB, e.g. a motherboard, or packaging the device with the processor in a multichip package.

The process 118 is believed to reduce the cost of designing and manufacturing devices capable of adding specific functionality to a plurality of systems that each use different buses. Because the devices are configured to communicate through a variety of different types of buses, a single device may be used in a variety of different applications, thereby simplifying the design and manufacture of the device.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device, comprising:
    a core module;
    a core bus coupled to the core module; and
    a bus translator coupled to the core module via the core bus, wherein the bus translator is configured to translate between signals from a selected one of a plurality of different types of buses and signals on the core bus,
    wherein the core module comprises a pattern-recognition processor, wherein the pattern recognition processor comprises:
        a decoder having an input configured to receive a data stream to be searched; and
        a plurality of feature cells coupled to the row decoder, wherein each of the plurality of feature cells comprise a plurality of memory cells each addressable by a conductor coupled to an output of the decoder.

2. The device of claim 1, wherein the core module comprises memory.

3. The device of claim 1, wherein the core module comprises a drive controller.

4. The device of claim 1, wherein the core module comprises a data-acquisition module.

5. The device of claim 1, wherein the bus translator comprises a multiplexer that couples the core bus to the selected one of the plurality of different types of buses.

6. The device of claim 5, wherein the bus translator comprises a demultiplexer that couples the core bus to the selected one of the plurality of different types of buses.

7. The device of claim 1, comprising a bus I/O driver configured to translate voltages of signals on the core bus to different voltages of signals on the selected one of the plurality of different types of buses.

8. The device of claim 1, wherein the bus translator is configured to translate timing of signals on the core bus to different timing of signals on the selected one of the plurality of different types of buses.

9. The device of claim 1, comprising the plurality of different types of buses.

10. The device of claim 9, wherein each of the plurality of different types of buses comprises drivers.

11. The device of claim 10, wherein the drivers for each of the plurality of different types of buses are not shared among the plurality of different types of buses.

12. The device of claim 9, wherein each of the plurality of different types of buses comprises a bus physical interface.

13. The device of claim 9, wherein the plurality of different types of buses comprise a double-data rate 3 (DDR3) bus.

14. The device of claim 13, wherein the plurality of different types of buses comprise a PCI express bus.

15. The device of claim 9, wherein the plurality of different types of buses comprise:
    a bus with non-multiplexed address and data; and
    a bus with multiplexed address and data.

16. The device of claim 9, wherein the plurality of different types of buses comprise:
    a synchronous bus; and
    an asynchronous bus.

17. The device of claim 9, wherein the plurality of different types of buses comprise:
    a serial bus; and
    a parallel bus.

18. A system, comprising:
    a processor; and
    a device coupled to the processor, wherein the device comprises:
        a core module, wherein the core module comprises a pattern-recognition processor, wherein the pattern recognition processor comprises:
            a decoder having an input configured to receive a data stream to be searched; and
            a plurality of feature cells coupled to the row decoder, wherein each of the plurality of feature cells comprise a plurality of memory cells each addressable by a conductor coupled to an output of the decoder; and
        a bus translator, wherein the core module is coupled to the processor through the bus translator.

19. The system of claim 18, wherein the bus translator comprises physical bus interfaces for more than one different type of bus.

20. The system of claim 19, wherein the bus translator comprises bus drivers configured to drive signals on more than one different type of bus.

21. The system of claim 18, wherein the bus translator comprises a multiplexer.

* * * * *